US012770058B2

(12) United States Patent
Min et al.

(10) Patent No.: US 12,770,058 B2
(45) Date of Patent: Oct. 20, 2026

(54) APPARATUS FOR SEARCHING SODIUM SUPERION CONDUCTOR MATERIAL USING MACHINE LEARNING METHOD

(71) Applicant: Foundation of Soongsil University-Industry Cooperation, Seoul (KR)

(72) Inventors: Kyoungmin Min, Suwon-si (KR); Juo Kim, Bucheon-si (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 796 days.

(21) Appl. No.: 18/142,395

(22) Filed: May 2, 2023

(65) Prior Publication Data

US 2024/0265293 A1 Aug. 8, 2024

(30) Foreign Application Priority Data

Feb. 6, 2023 (KR) ........................ 10-2023-0015357

(51) Int. Cl.
*G06F 11/30* (2006.01)
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2022/0131180 A1 4/2022 Wang et al. ...... H01M 10/0525
2025/0218554 A1* 7/2025 Sumaria ................. G16C 20/70

FOREIGN PATENT DOCUMENTS

KR 10-2022-0081053 A 6/2022
KR 10-2022-0118782 A 8/2022

OTHER PUBLICATIONS

Bin Ouyang et al., Synthetic accessibility and stability rules of NASICONs, Nature Communications, https://doi.org/10.1038/s41467-021-26006-3.

R. E. Morris, Computational Study of Solid-State Superionic Conductor using DFT&Bond Valence Approaches, Thesis, University of Liverpool(Aug. 6, 2022).

(Continued)

*Primary Examiner* — Phuong Huynh
(74) *Attorney, Agent, or Firm* — Stein IP, LLC

(57) ABSTRACT

An apparatus for providing sodium superion conductor material information using a machine learning method is provided. The apparatus includes a classification unit for generating classification information by classifying sodium superion conductor material information by comparing an output value obtained by inputting material characteristic information into a sodium superion conductor material search model with a preset threshold value: a first verification unit for selecting information on a structure in an electrochemically stable state using Ewald summation from the generated classification information; and a second verification unit for selecting and providing final information on a structure having high ionic conductivity using AIMD simulation from the information on the structure in the electrochemically stable state.

6 Claims, 6 Drawing Sheets

(56) References Cited

OTHER PUBLICATIONS

S. Y. Lim at all, Electrochemical and Thermal Properties of NASICON Structured Na3V2(PO4)3 as a Sodium Rechargeable Battery Cathode: A Combined Experimental and Theoretical Study, J. Electrochem. Soc. vol. 159, A1393(Aug. 14, 2012).
K. K. Rao, Machine Learning Guided Discovery of Advanced Functional Energy Materials, Thesis, University of Houston(Dec. 1, 2022).
Notice of Submission of Opinion mailed Jan. 13, 2026, issued to Korean Patent Application No. 10-2023-0015357.

* cited by examiner

APPARATUS FOR SEARCHING SODIUM SUPERION CONDUCTOR MATERIAL USING MACHINE LEARNING METHOD

CROSS-REFERENCE TO RELATED APPLICATIONS

This application claims the benefit of Korean Application No. 10-2023-0015357 filed Feb. 6, 2023, in the Korean Intellectual Property Office. All disclosures of the document named above are incorporated herein by reference.

TECHNICAL FIELD

The present invention relates to an apparatus for obtaining and providing sodium superion conductor material information using a machine learning method.

BACKGROUND ART

A lithium ion battery (LIB) is widely used as an energy storage device because of its advantages such as high energy density, low self-discharge rate, long lifespan, and high cell voltage. However, due to the high production cost and lack of lithium, sodium ion batteries (SIBs) using sodium, which have electrochemical properties similar to those of lithium but have abundant reserves, are being studied as next-generation batteries.

On the other hand, solid-state electrolytes (SSE) are attracting attention as a promising alternative to LIBs because of their low production cost unlike liquid electrolytes, the abundance of resources, and electrical/chemical properties similar to those of lithium ion batteries (LIBs). In particular, research on sodium ion solid electrolytes (SSE), which can increase energy density by using metal as an anode material and effectively suppress the formation of dendrites while solving the flammability problem of existing liquid electrolytes, is growing rapidly.

However, since solid electrolytes have lower ionic conductivity than conventional liquid electrolytes, research is being actively conducted to find solid electrolyte materials having ionic conductivity similar to that of liquid electrolytes.

Sodium (Na) SuperIonic Conductor ("NASICON") is one of the well-known sodium ion SSEs. NASICON has a chemical formula of $Na_{1+x}M_2(AO_4)_3$ ($0 \le x \le 3$), and has a structure, in which the $AO_4$ tetrahedron and the MOs octahedron share a three-dimensional space. $Na^+$ ions move through the empty space formed between the tetrahedral and octahedral structures. The high ionic conductivity and thermodynamic stability of the NASICON structure have sufficient properties to be used as SSE, and materials with ionic conductivity of $10^{-3}$ S/cm or more have been reported in several studies.

Since the NASICON structure was published, many studies have been conducted to explore NASICON materials with higher ionic conductivity and stability. In general, in the field of material search, synthesis is attempted by doping material with other elements or changing the experimental method, and the synthesized material is subjected to several trials and errors in the process of experimentation and analysis to measure ionic conductivity and interfacial stability. Although this traditional method is accurate, there are problems in that a lot of cost and time are incurred in the research process, and many variables occur depending on the experimental conditions even for the same material.

In order to solve this problem, many studies are being conducted to predict desired properties more quickly and accurately in the conventional material search field through high-throughput calculation and machine learning, but an apparatus for searching for sodium superion conductor material that provides sodium superion conductor material information having electrochemically stability and excellent ion conductivity while having a high level of accuracy and speed required in the technical filed, to which the present invention belongs, is not provided.

DISCLOSURE

Technical Problem

An object of the present invention is to provide an apparatus for searching for sodium superion conductor material that provides a sodium superion conductor material information having electrochemical stability and excellent ionic conductivity using high-throughput calculation and machine learning.

The present invention is also to provide an apparatus for searching for sodium superion conductor material having a machine learning model, which is a surrogate model as a sodium superion conductor material search model that generates classification information by classifying sodium superion conductor material information by receiving extracted feature information from test data.

The present invention is also to provide an apparatus for searching for sodium superion conductor material including a learning unit that provides learning data to a sodium superion conductor material search model, which is a machine learning model, and improves the accuracy of the model by training the sodium superion conductor material search model in a supervised learning method.

Another object of the present invention is to provide an apparatus for searching for a sodium superion conductor material that generates sodium superion conductor material information having an ion conductivity of $10^{-4}$ S/cm or more.

The problems to be solved by the present invention are not limited to the problems mentioned above, and the problems to be solved by the present invention that are not mentioned can be clearly understood by those of ordinary skill in the art to which the present invention belongs ("those skilled in the art").

Technical Solution

In order to solve the above technical problem, an apparatus for providing sodium superion conductor material information using a machine learning method according to an embodiment of the present invention comprises,

- a classification unit for generating classification information by classifying sodium superion conductor material information by comparing an output value obtained by inputting material characteristic information into a sodium superion conductor material search model with a preset threshold value;
- a first verification unit for selecting information on a structure in an electrochemically stable state using Ewald summation from the generated classification information; and
- a second verification unit for selecting and providing final information on a structure having high ionic conductivity using AIMD simulation from the information on the structure in the electrochemically stable state.

Further, the apparatus further comprises an extraction unit for receiving test data and extracting material characteristic information including chemical information therefrom.

Further, the apparatus further comprises a learning unit for training the sodium superion conductor material search model, wherein the learning unit receives learning data and uses it to improve precision in selecting the sodium superion conductor material information by training the sodium superion conductor material search model in a supervised manner.

Further, the apparatus further comprises an optimization unit for optimizing the preset threshold value of the classification unit, wherein the optimization unit optimizes the preset threshold value by adjusting accuracy, precision, and recall of the sodium superion conductor material search model.

Advantageous Effects

According to the present invention, it is possible to provide an apparatus for searching for sodium superion conductor material that provides sodium superion conductor material information having electrochemical stability and excellent ion conductivity, and through this, an apparatus for searching for a sodium superion conductor material that generates sodium superion conductor material information having ionic conductivity of $10^{-4}$ S/cm or more can be provided.

The excellent and/or useful effects according to the present invention are not limited to the effects of the present invention described above, and those skilled in the art can readily recognize the excellent and/or useful effects of the present invention not explicitly disclosed herein based on the disclosure of the present specification. Thus, it should be understood that such useful effects are intentionally disclosed by this specification and are obviously included in the scope of the present disclosure.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
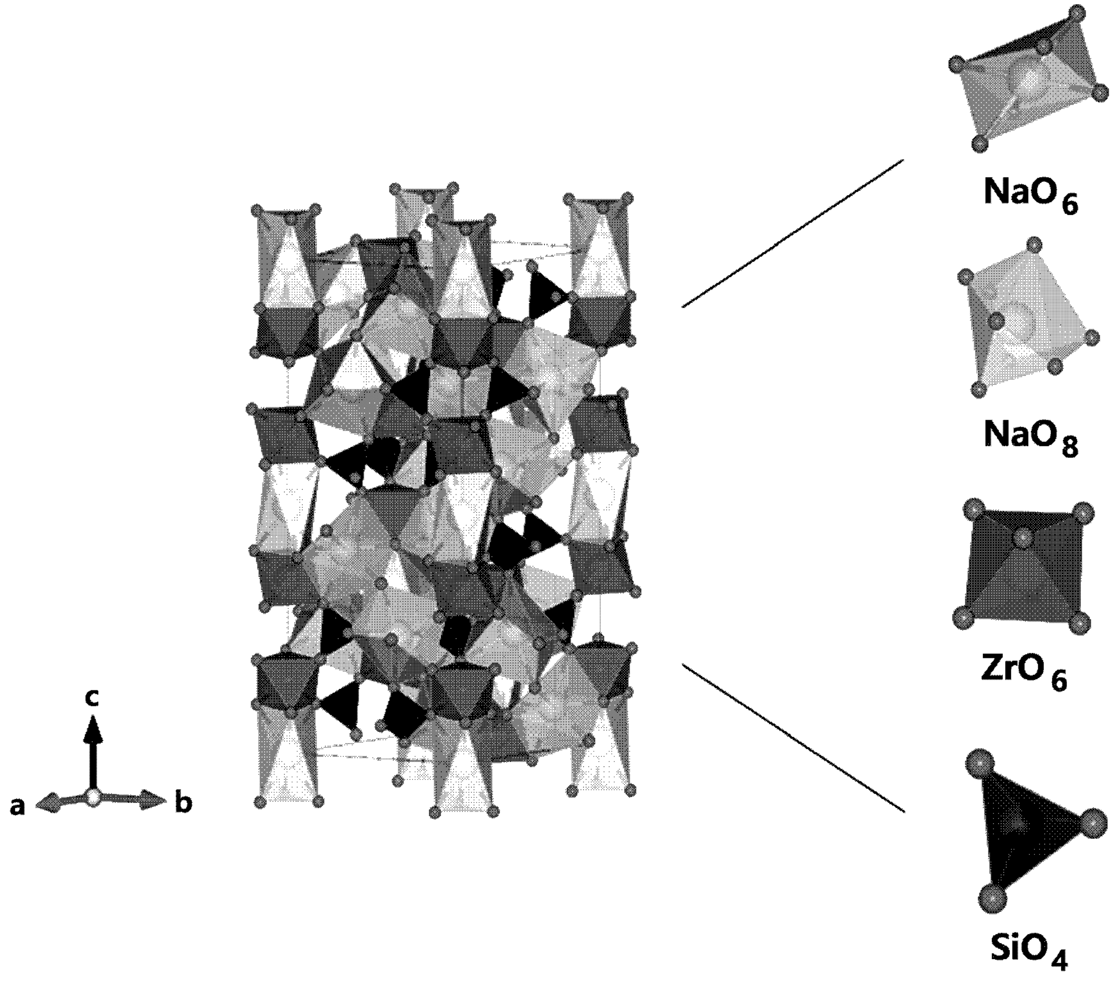
FIG. 1 shows the crystal structure of a general NASICON structure.
Figure 2:
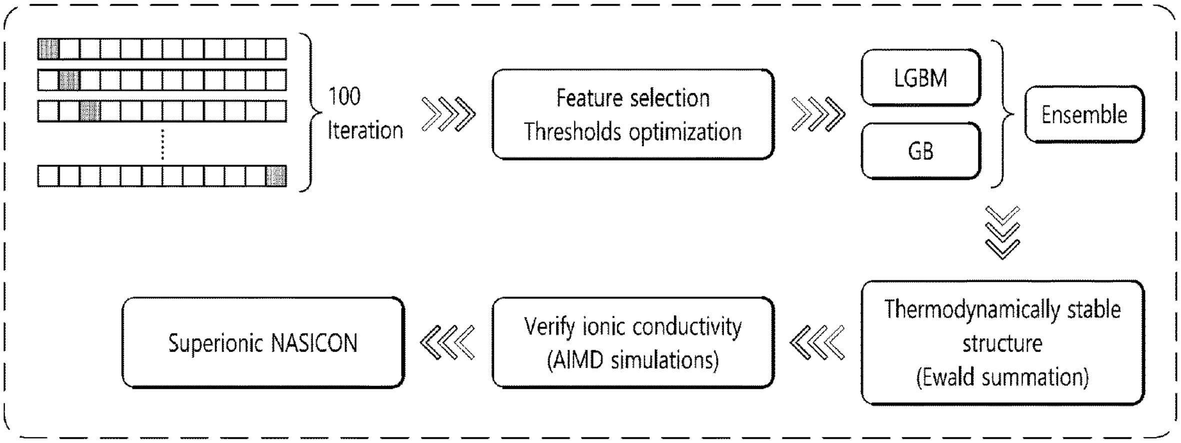
FIG. 2 schematically shows a process of generating sodium superion conductor material information by an apparatus for searching for a sodium superion conductor material using a machine learning method according to the present invention.

Hereinafter, the present invention will be described in detail.

The following embodiments combine elements and features of the embodiments in a predetermined form. Each component or feature may be considered optional unless explicitly stated otherwise. Each component or feature may be implemented in a form not combined with other components or features. In addition, various embodiments may be configured by combining some components and/or features. The order of operations described in various embodiments may be changed. Some components or features of one embodiment may be included in another embodiment, or may be replaced with corresponding components or features of another embodiment.

In the description of the drawings, procedures or steps that may obscure the gist of various embodiments are not described, and procedures or steps that can be understood by those skilled in the art are not described.

Throughout the specification, when a part is said to “comprising” or “including” a certain component, it means that it may further include other components, not excluding other components, unless otherwise stated. In addition, terms such as “ . . . unit,” and “module” described in the specification mean a unit that processes at least one function or operation, which can be implemented as hardware or software or a combination of hardware and software. Also, “a or an,” “one,” “the” and like terms used herein in the context of describing various embodiments (particularly in the context of the claims below) can be used to include both the singular and the plural unless otherwise indicated or clearly contradicted by context.

Hereinafter, embodiments according to various embodiments will be described in detail with reference to the accompanying drawings. The detailed description set forth below in conjunction with the accompanying drawings is intended to describe exemplary embodiments of various embodiments, and is not intended to represent a single embodiment.

In addition, specific terms used in various embodiments are provided to help understanding of various embodiments, and the use of these specific terms may be changed in other forms without departing from the technical spirit of various embodiments.

Meanwhile, each description and embodiment disclosed in this specification may also be applied to each other description and embodiment. That is, all combinations of various components disclosed herein fall within the scope of the present invention, and descriptions omitted in one embodiment may be interpreted in the same manner as described in another embodiment. In addition, it cannot be seen that the scope of the present invention is limited by the specific descriptions described below.

According to one aspect of the present invention, an apparatus for providing sodium superion conductor material information using a machine learning method according to the present invention may comprise:

a classification unit for generating classification information by classifying sodium superion conductor material information by comparing the output value obtained by inputting the material characteristic information into the sodium superion conductor material search model with a preset threshold value;

a first verification unit for selecting information on a structure in an electrochemically stable state using Ewald summation from the generated classification information;

a second verification unit for selecting and providing final information on a structure having high ionic conductivity using AIMD simulation from the information on the structure in the electrochemically stable state.

According to an embodiment, the sodium superion conductor material search model used in the classification unit is a model, to which a machine learning method is applied, and may include detailed machine learning model units, and each detailed machine learning model unit can perform prediction several times for each of the verification data formed by receiving the material characteristic information of the sodium superion conductor material known through previous experiments. For example, the detailed machine learning model unit may be 9 machine learning model units of Naïve Bayes ("NB"), Logistic Regression ("LR"), Decision Tree ("DT"), Stochastic Gradient Descent (Stochastic Gradient Descent ("SGD"), K-Nearest Neighbor ("KNN"), Random Forest ("RF"), Gradient Boosint ("GB"), Light Gradient Boosting Machine ("LGBM"), and eXtreme Gradient Boosting ("XGB"), and the prediction may be 100 times.

In addition, for example, the material characteristic information may be 264 NASICON and LISICON materials previously known through experiments, and the verification data may be 3573 NASICON verification data, and may be a material whose synthesizability and stability have been verified through convex hull energy by using high-throughput density functional theory (DFT), and materials showing high ionic conductivity among the verification data may be predicted by each of the detailed machine learning model units.

In general, liquid electrolytes exhibit ionic conductivity in the range of $10^{-4}$ S/cm to $10^{-2}$ S/cm, but since SSE has a lower ionic conductivity than liquid electrolytes, the ionic conductivity that can actually be used as an electrolyte can be determined. For example, a criterion for a classification model may be set at $\sigma=10^{-4}$ S/cm to determine whether it is a superionic or non-superionic conductor.

Classification may be performed while adjusting the random state from 0 to 99 100 times for each machine learning model unit for cross-verification. The average accuracy can be applied for 9 detailed machine learning model units, NB, LR, DT, SGD, KNN, RF, GB, LGBM, and XGB units on 100 different train-test sets, and even when the same data is used, the accuracy may be different depending on which detailed machine learning model unit is used. There are many reasons why a particular model has high accuracy, but it may be the result of certain data fitting a particular model and exhibiting high performance, or an error caused by overfitting. Therefore, a unit suitable for the purpose may be selected through a comparison of various detailed machine learning model units.

The material characteristic information is information shown in Table 1 below, and may be information obtained by combining stoichiometric characteristics and characteristics of elements extracted based on the chemical formulas of each material.

TABLE 1

| Meaning of Chemical descriptors(CD) | Number of Attributes | | Attributes |
|---|---|---|---|
| Stoichiometric attributes (number of components according to Ip norms) | 6 | | Ncomp. Comp_L2Norm, Comp_L3Norm, Comp_L5Norm, Comp_L7Norm, Comp_L10Norm |
| Elemental property-based attributes | 132 | Min(22) Mean(22) Max(22) Most(22) Range(22) Dev(22) | Atomic Number, MendeleevNumber, AtomicWeight, MeltingT, Column, Row, CovalentRadius, Electronegativity, NsValence, NpValence, NdValence, NfValence, Nvalance, NsUnfilled, NpUnfilled, NdUnfilled, NfUnfilled, Nunfilled, Gsvolumepa, Gsbandgap, Gsmagmom, SpaceGroupNumber |
| Valence orbital occupation attributes (the fraction-weighted average of the total number of valance electrons) | 4 | | frac_sValence, frac_pValence, frac_dValence, frac_fValence |
| Ionic compound attributes (ionic character) | 3 | | CanFormIonic, MaxIonicChar, MeanIonicChar |

In addition, the apparatus for providing the sodium superion conductor material information using the machine learning method may further comprise an extraction unit for receiving test data and extracting material characteristic information including chemical information therefrom.

In addition, the apparatus for providing sodium superion conductor material information using the machine learning method may further comprise a learning unit for training the sodium superion conductor material search model, wherein the learning unit receives learning data and uses it to improve accuracy in selecting the sodium superion conductor material information by training the sodium superion conductor material search model in a supervised manner.

The extraction unit may extract the material characteristic information from the test data in order to extract the information shown in Table 1 above. In addition, the extraction unit may additionally extract information on each atom constituting the chemical formula from the test data as information different from the material characteristic information shown in Table 1, and for example, may additionally extract the information shown in Table 2 below. In this case, both the material characteristic information shown in Table 1 and the information shown in Table 2 below may be provided to the classification unit as material characteristic information.

TABLE 2

| Feature | Definition | Equation |
|---|---|---|
| RDiffLst | Difference of ionic radius of D2, D3 | =\| D2ionicr − D3ionicr \| |
| RDiffStdLst | Standard deviation of RDiffLst | Tabulated |
| EleNegStdLst | Standard deviation of electronegativity | |
| XDiffLst | Difference of electronegativity of D2, D3 | =\| D2enr − D3ener \| |

TABLE 2-continued

| Feature | Definition | Equation |
|---|---|---|
| XWithNaLst | Difference of electronegativity of D1, D2 | =\| D1enr − D2ener \| |
| ChgDiffLst | Charge difference of D2 | |
| D1ionicr | Ionic radius of D1 | Tabulated |
| D2ionicr | Ionic radius of D2 | Tabulated |
| D3ionicr | Ionic radius of D3 | Tabulated |
| D1eff | Calculated ionic radius of D1 | =D1ionicr × $N_{D1}$ |
| D2eff | Calculated ionic radius of D2 | =D2ionicr × $N_{D2}$ |
| D3eff | Calculated ionic radius of D3 | =D3ionicr × $N_{D3}$ |
| D1volperatom | Calculated volume of D1 | $=\frac{4}{3}\pi(\text{D1ionicr})^3$ |
| D2volperatom | Calculated volume of D2 | $=\frac{4}{3}\pi(\text{D2ionicr})^3$ |
| D3volperatom | Calculated volume of D3 | $=\frac{4}{3}\pi(\text{D3ionicr})^3$ |
| D1vol | Volume of D1 | $=\frac{4}{3}\pi(\text{D1ionicr})^3 \times N_{D2}$ |
| D2vol | Volume of D2 | $=\frac{4}{3}\pi(\text{D2ionicr})^3 \times N_{D2}$ |
| D3vol | Volume of D3 | $=\frac{4}{3}\pi(\text{D3ionicr})^3 \times N_{D3}$ |
| D1ener | Electronegativity of D1 | Tabulated |
| D2ener | Electronegativity of D2 | Tabulated |
| D3ener | Electronegativity of D3 | Tabulated |
| D1eneff | Calculated electronegativity of D1 | =D1ionicr × $N_{D1}$ |
| D2eneff | Calculated electronegativity of D2 | =D2ionicr × $N_{D2}$ |
| D3eneff | Calculated electronegativity of D3 | =D3ionicr × $N_{D3}$ |

In Table 2, D1, D2, and D3 mean Na, $M_1$, and $M_2$ of the chemical formula $Na_xM_1M_2(PO_4)_3$, respectively, and among the information shown in Table 2, the Shannon ionic radius, Pauling scale electronegativity, and calculated volume may be generated as a characteristic by considering each part of the element. As can be seen from Table 2, nine characteristics can be generated through ionic radius, electronegativity, and effective volume of atoms, respectively, and the number of atoms in each of D1, D2, and D3 can be multiplied by previously calculated properties such as ionic radius, electronegativity, and volume to generate nine or more characteristics, and the difference value between the atomic radii of D1, D2, and D3, the standard deviation of the difference value and electronegativity can generate 6 more characteristics.

In addition, the apparatus for providing the sodium superion conductor material information using the machine learning method further comprises an optimization unit for optimizing a preset threshold of the classification unit, wherein the optimization unit may optimize the preset threshold value by adjusting accuracy, precision, and recall of the sodium superion conductor material search model.

Figure 3:
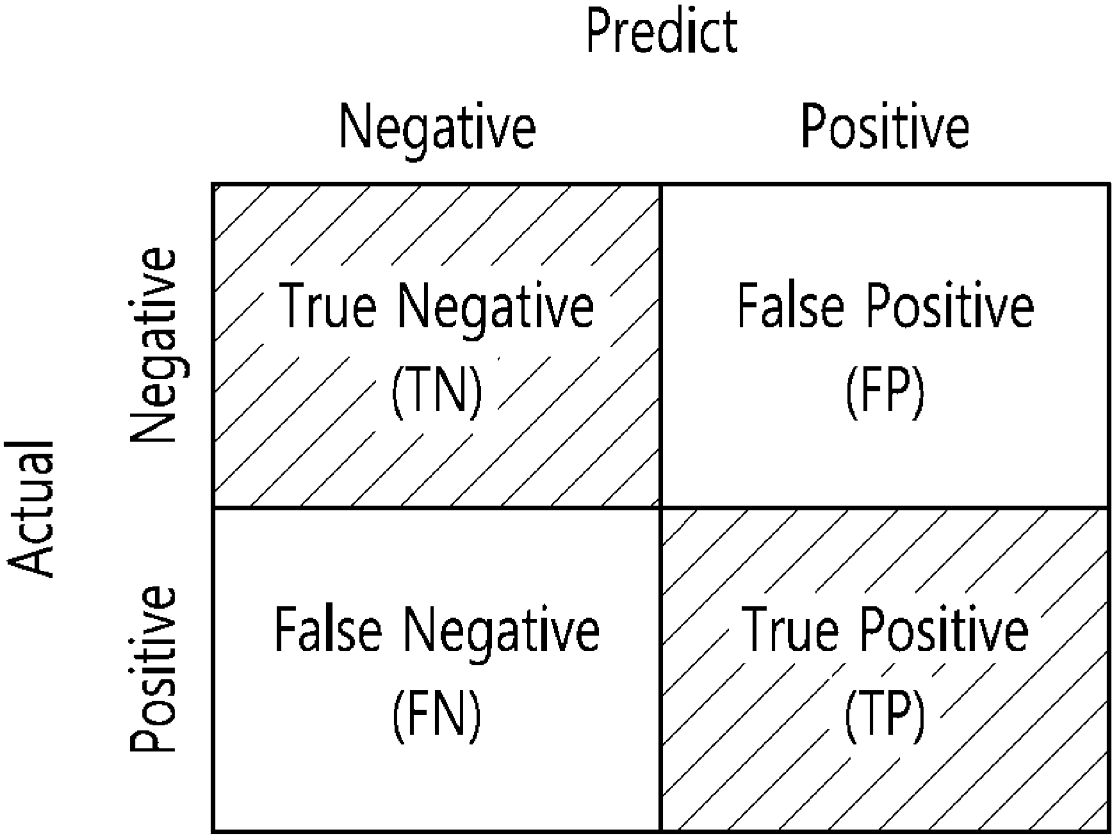
FIG. 3 shows an example of a confusion matrix that may be considered in the process of optimizing a preset threshold value by an optimization unit included in an apparatus for searching for a sodium superion conductor material using a machine learning method according to the present invention.

Each of the accuracy, precision, and recall can be expressed by the following equation using each factor of the confusion matrix shown in FIG. 3.

$$\text{Accuracy} = \frac{(TN + TP)}{(TN + FP + FN + TP)}$$

$$\text{Precision} = \frac{TP}{(FP + TP)}$$

$$\text{Recall} = \frac{TP}{(FN + TP)}$$

In the case of accuracy, if the data used for training the sodium superion conductor material search model is biased, there may be a problem that even if the machine learning model classifies inaccurately, it can show high performance if it predicts according to the bias of the data. Therefore, even if the accuracy of the machine learning model is high, the prediction of the verification data cannot be fully trusted.

In the case of precision, it represents the proportion of true predictions that are actually true, so predictions are reliable when precision is high. However, when only the precision is extremely high, machine learning predicts and provides the result only when it is definitely true, so there may be data that is not included in the predicted result even though it is actually true.

Figure 4:
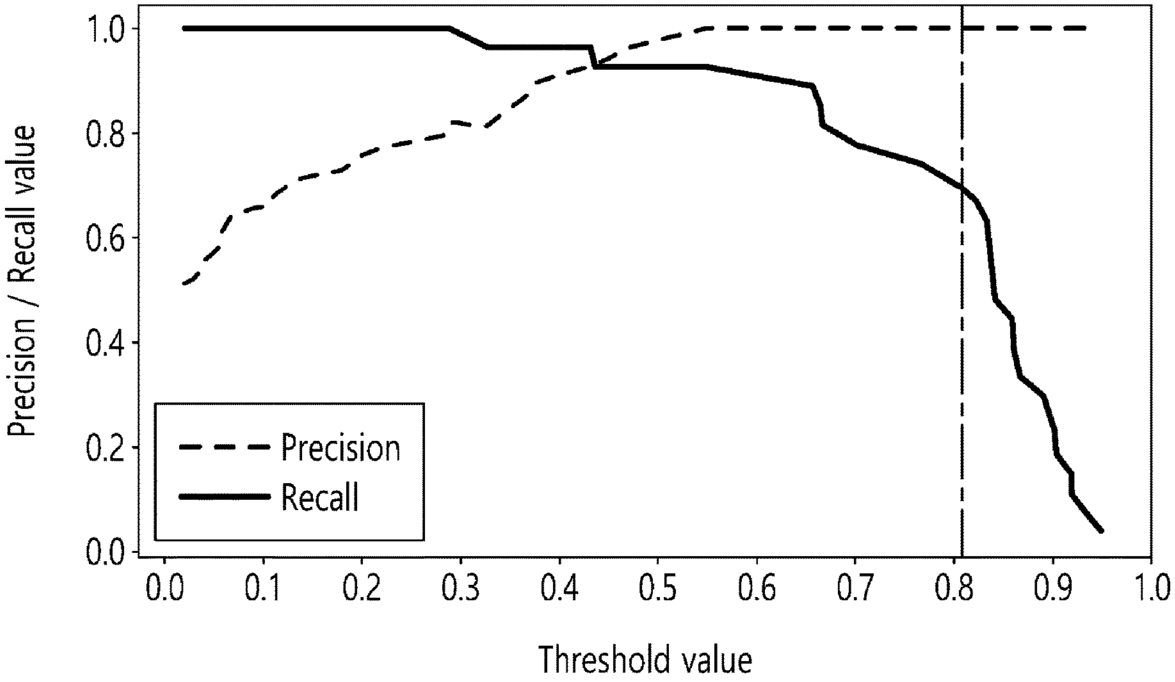
FIG. 4 shows a graph showing a threshold value that can be selected in a process of optimizing a preset threshold value by an optimization unit included in an apparatus for searching for a superionic sodium conductor material using a machine learning method according to the present invention.

Considering the above, in order to increase the classification reliability of the machine learning model and include as many true data as possible in the classification information, the preset threshold value of the sodium superion conductor material search model may be adjusted in consideration of all of the accuracy, precision, and recall. For example, referring to FIG. 4, the recall may be greater than or equal to 0.7, and the precision may be the largest value within a range satisfying the recall.

The Ewald summation used in the first verification unit for selecting information on the structure in an electrochemically stable state from the generated classification information can be used to determine whether a structure expected to be included in the sodium superion conductor material represented by the material information included in the classification information is in an electrochemically stable state.

The AIMD simulation used in the second verification unit for selecting and providing final information on the structure having high ionic conductivity from the information on the structure in the electrochemically stable state may be ab initio molecular dynamics ("AIMD") simulation using the Vienna ab initio simulation package ("VASP"). For example, the Perdew-Burke-Emzerhof generalized gradient approximation can be applied as the exchange-correlation function, the plane wave cutoff can be 400 eV, and the gamma-centered 1×1×1 may be applied for k-point grid generation.

EXPERIMENTAL EXAMPLE

To discover the most reliable and accurate ML model, PyCaret is used to compare the performance of 9 detailed machine learning model units, NB, LR, DT, SGD, KNN, RF, GB, LGBM, and XGB units, and their subsequent Hyperparameter optimizations. Among them, the DT, LGBM, and GB models showed higher accuracy than others, and DT showed the highest accuracy. However, DT was excluded to reduce the risk of overfitting, and LGBM and GB were selected as the final detailed machine-learning model units. From the two detailed machine learning model units, the intersection ensemble was finally performed, and the intersection of materials classified as having superionic properties was performed 100 times and selected.

Then, material characteristic information for use in the machine learning model according to the present invention was selected. The additionally selected material characteristic information comprises characteristics of each element such as electronegativity, ionic radius of the element, and number of atoms. The average accuracy for this was 0.853, 0.847 and 0.829 for DT, GB and LGBM, respectively.

Then, the accuracy, precision, and recall of the model were evaluated in order to optimize the preset threshold value of the classification unit including the machine learning model according to the present invention. Referring to FIG. 3, a trade-off relationship between precision and recall can be confirmed. Therefore, in the case where recall is excluded and only precision is increased, superionic material may not be classified as superionic material according to the model according to the present invention even if they are actually superionic material. Therefore, in the case of having the highest precision value while having a recall exceeding a specific level, the performance of the machine learning model according to the present invention can be improved while minimizing the loss of accuracy.

In this embodiment, the recall was 0.7 or more, and the precision was selected to have the highest value within the range of the recall. In terms of accuracy, LGBM goes from 0.8311 to 0.8383 and GB goes from 0.8464 to 0.8460, indicating a slight increase or decrease. Referring to FIG. 3, a confusion matrix representing this can be identified, and referring to FIG. 5, a confusion matrix according to the present embodiment can be identified.

As a result of using the apparatus according to the present invention, the number of materials selected more than 80 times was 389 (10.085%) in LGBM and 144 (4.01%) in GB, and the number of materials selected more than 90 times was 215 (5.99%) in LGBM and 111 in GB (3.09%). The number of the materials selected for all 100 times was 91 (2.53%) in LGBM and 14 (0.39%) in GB. The model performance was evaluated in the most conserved state by selecting materials, which were selected 100 times. Since the two detailed machine learning model units had different operating principles and showed slight differences in the number of classified materials, these two models were evaluated for verification under the most stringent conditions. As a result, seven materials were finally selected as sodium superionic conductor materials.

This was then evaluated using Ewald summation. Among the finally selected materials, the M position is composed of Ta, T, Sc, La, and Hf. The most common remaining element is Ta. That is, when Ta is used as a dopant of a NASICON-type LATP or LATP structure, ionic conductivity may be increased. The next most common elements are the trivalent cations of Y, Sc and La. These trivalent cations can be doped with the aim of occupying the tetravalent cation sites to increase the cell size and increase the ionic conductivity. Two of the seven materials contained Hf.

Figure 5:
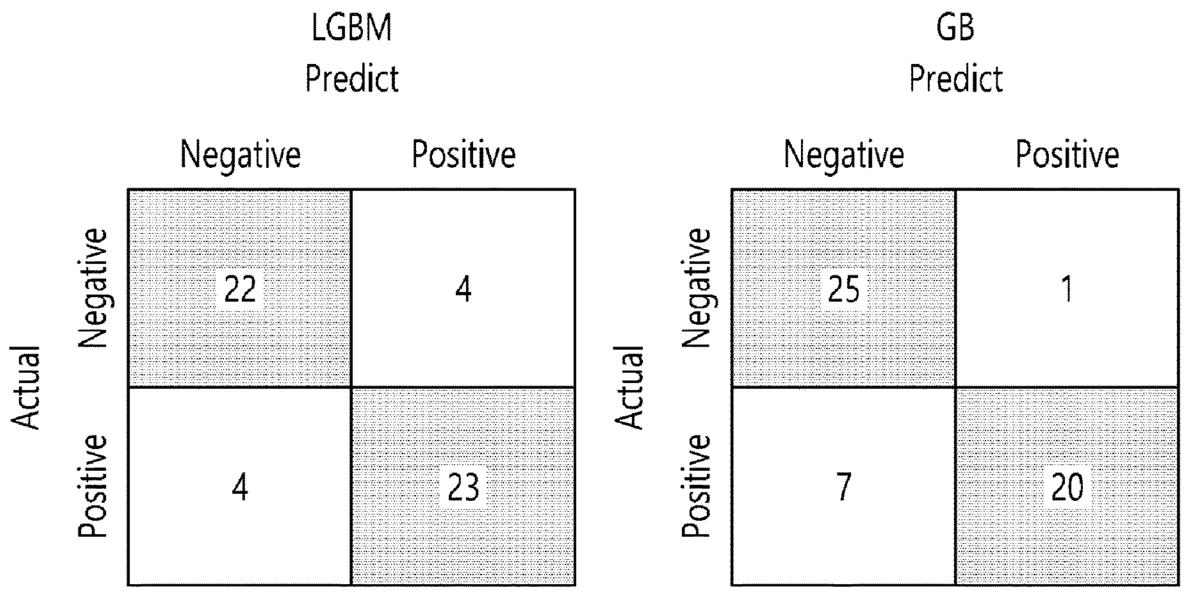
FIG. 5 shows a specific example of a confusion matrix that may be considered in the process of optimizing a preset threshold value by an optimization unit included in an apparatus for searching for a sodium superion conductor material using a machine learning method according to the present invention.
Figure 6:
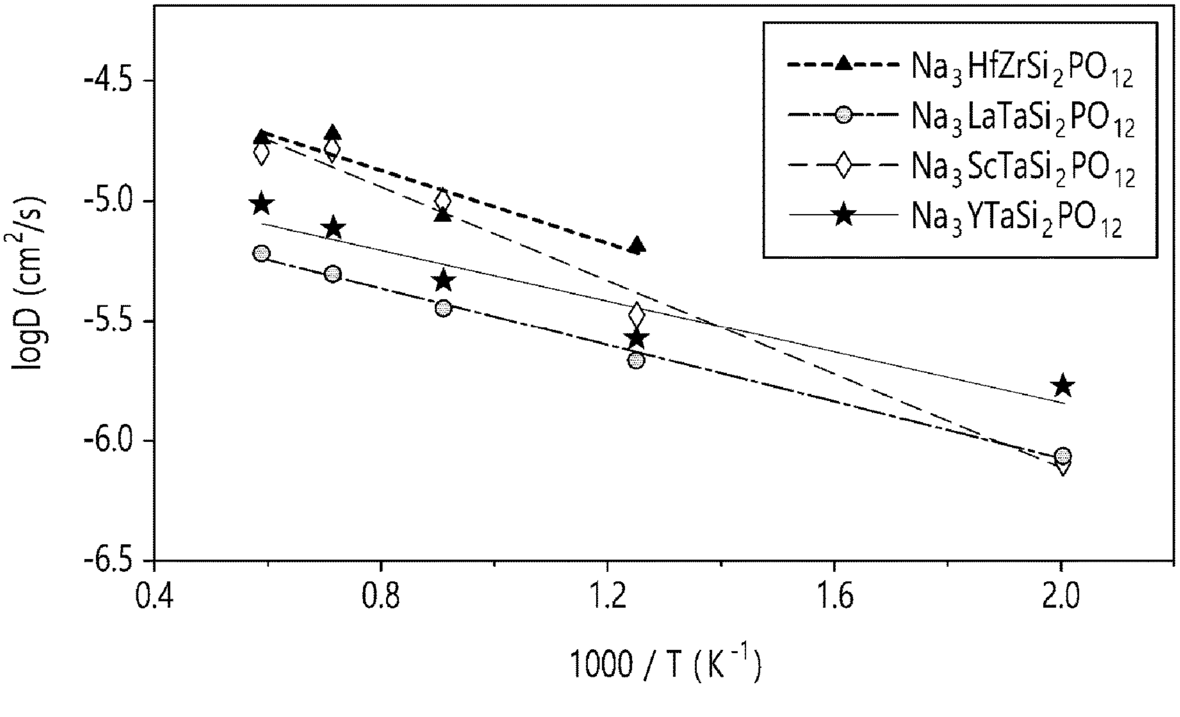
FIG. 6 shows the diffusivity versus temperature relationship evaluated for the final four materials selected by the apparatus according to the present invention.

Then, the ionic conductivities at room temperature (RT) of the final selected materials were evaluated using AIMD simulations. Prior to calculation, the structural information of the screened materials was obtained by the Ewald summation method in the Pymatgen package. Among the above materials, three of the seven materials were excluded because AIMD simulation consistent results did not converge. For the remaining four materials, the diffusivity versus temperature relationship is shown in FIG. 5, and the ionic conductivity and activation energy values are shown in Table 3 below.

TABLE 3

| Index | Formula | Convergence | σ at RT [mS/cm] | Ea [meV] |
|---|---|---|---|---|
| 1 | $Na_3YTaSi_2PO_{12}$ | O | 19.9576 | 106 |
| 2 | $Na_3HfZrSi_2PO_{12}$ | O | 11.5248 | 150 |
| 3 | $Na_3LaTaSi_2PO_{12}$ | O | 9.5542 | 118 |
| 4 | $Na_3ScTaSi_2PO_{12}$ | O | 1.5353 | 207 |
| 5 | $Na_6Hf_2Zr_2Si_5SO_{12}$ | X | . | . |
| 6 | $Na_6La_2Ta_2Si_5SO_{12}$ | X | . | . |
| 7 | $Na_6Y_2Ta_2Si_5SO_{12}$ | X | . | . |

As a result, it was confirmed that the four materials finally selected exhibit significant Na-ion diffusivity in the high-temperature region, exceed the determination criterion ($\sigma > 10^{-4}$ S/cm), and also have a trend that ionic conductivity and activation energy (Ea) are in inverse proportion to each other.

To summarize the entire process of this experimental example, starting from 3,573 NASIOCN materials, 7 superionic candidate materials were optimized with a preset threshold value from 0.5 to 0.7, and then the optimal machine learning model unit was selected using material characteristic information, and then classification information was generated using this. Four of each material represented by the generated classification information were confirmed to be superionic materials through AIMD.

That is, the present inventors proved that the sodium superionic conductor material search model according to the present invention was effective in selecting the superionic NASICON material. Surrogate models can play an important role in accelerating material selection and reducing costs by classifying NASICON-type SSE materials without unnecessary time-consuming high-throughput calculations or actual experiments performed. It can also be used to effectively classify the ionic conductivities of NASICON-type SSEs as well as other SSE materials targeting superionic materials with simple chemical properties of the materials.

Although the preferred embodiments of the present invention have been described in detail above, the scope of the present invention is not limited thereto, and various modifications and improvements of those skilled in the art using the basic concept of the present invention defined in the following claims are also belong to the scope of the invention.

The invention claimed is:

1. An apparatus for providing sodium superion conductor material information using a machine learning method comprising:

an extraction unit configured to receive test data and to extract material characteristic information including chemical information therefrom;

a classification unit configured to input the extracted material characteristic information into a sodium superion conductor material search model, to compare an output value obtained by inputting material characteristic information into the sodium superion conductor material search model with a preset threshold value, and to generate classification information identifying one or more candidate sodium superion conductor materials information;

a first verification unit configured to perform Ewald summation on structures corresponding to the one or more candidate sodium superion conductor materials information identified by the classification information and to select, based on the Ewald summation, information on a structure in an electrochemically stable state; and a second verification unit configured to perform ab initio molecular dynamics simulation on the structure in the electrochemically stable state and to select and provide final information identifying a structure having high ionic conductivity.

2. The apparatus of claim 1 further comprises, a learning unit configured to train the sodium superion conductor material search model, wherein the learning unit receives learning data and uses it to improve precision in selecting the sodium superion conductor material information by training the sodium superion conductor material search model in a supervised manner.

3. The apparatus of claim 1 further comprises, an optimization unit configured to optimize the preset threshold value of the classification unit, wherein the optimization unit optimizes the preset threshold value by adjusting accuracy, precision, and recall of the sodium superion conductor material search model.

4. The apparatus of claim 1, wherein the final information identifies a sodium superion conductor material having an ionic conductivity of $10^{-4}$ S/cm or more.

5. The apparatus of claim 2, wherein the final information identifies a sodium superion conductor material having an ionic conductivity of $10^{-4}$ S/cm or more.

6. The apparatus of claim 3, wherein the final information identifies a sodium superion conductor material having an ionic conductivity of $10^{-4}$ S/cm or more.

* * * * *